United States Patent [19]

Aurin et al.

[11] 4,239,342
[45] Dec. 16, 1980

[54] OPTICAL FOCUSING SYSTEM WITH TWO ELLIPSOIDAL MIRRORS

[75] Inventors: Friedrich Aurin, Heidenheim-Schnaitheim; Helmut Knutti, Oberkochen, both of Fed. Rep. of Germany

[73] Assignee: Carl Zeiss-Stiftung, Oberkochen, Fed. Rep. of Germany

[21] Appl. No.: 39,563

[22] Filed: May 16, 1979

[30] Foreign Application Priority Data

May 24, 1978 [DE] Fed. Rep. of Germany ....... 2822579

[51] Int. Cl.³ ................................................. G02B 5/10
[52] U.S. Cl. ................................................. 350/294
[58] Field of Search ................................. 350/294, 55

[56] References Cited

U.S. PATENT DOCUMENTS 2,819,649  1/1958  McLeod et al. ...................... 350/294
2,944,156  7/1960  Davy et al. ........................... 350/294

FOREIGN PATENT DOCUMENTS 1132605  11/1968  United Kingdom ...................... 350/294

*Primary Examiner*—Jon W. Henry
*Attorney, Agent, or Firm*—Stonebraker, Shepard & Stephens

[57] ABSTRACT

An optical focusing system having two mirrors with reflecting surfaces in the shape of ellipsoids of revolution. They are positioned relative to each other so that the second mathematical focal point of the first ellipsoid coincides with the first mathematical focal point of the second ellipsoid, counting the focal points in the direction of passage of the light, and the entrance pupil of the system lies at the first mathematical focal point of the first ellipsoid. The ratio of the length of the major axis to the length of the minor axis of the second ellipsoid is selected so that the isoplanasie condition for elimination of coma of third order is satisfied.

2 Claims, 1 Drawing Figure

U.S. Patent
Dec. 16, 1980
4,239,342
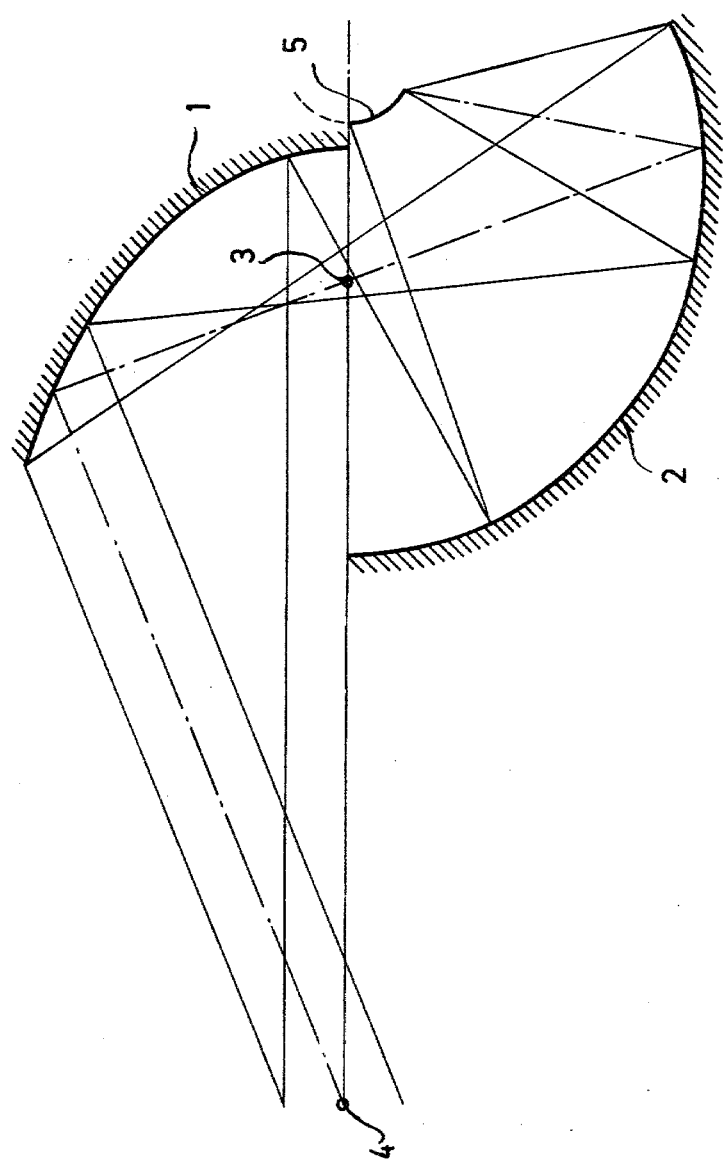

OPTICAL FOCUSING SYSTEM WITH TWO ELLIPSOIDAL MIRRORS

BACKGROUND OF THE INVENTION

The present invention relates to an optical focusing system which consists of two mirrors which are ellipsoids of revolution.

For visual indicators for aircraft and for projection systems in the case of simulators, there is a need for wideangle focusing systems with a large field of vision ($> \pm 12.5°$) and large relative aperture ($>1:2$), with widely spaced entrance pupil.

For these fields of use, it has already been proposed to use focusing systems having a concave mirror. In the known systems, the unsatisfactory correction of coma and astigmatism is a disadvantage. The condition for the correction of astigmatism in the case of surfaces of revolution of the second degree is also known. When using a surface of revolution of the second degree, astigmatism is corrected when the entrance pupil is located at a mathematical focal point of this surface. A focusing system having two mirrors which are ellipsoids of revolution is described, for instance, in British Pat. No. 1,132,605. In this known focusing system, however, the deviation from the isoplanasie condition is not corrected.

The object of the present invention is to apply the known conditions for the correction of astigmatism and at the same time correct the deviation from the isoplanasie condition, to a focusing system of large field of view, large relative aperture, and widely spaced entrance pupil.

SUMMARY OF THE INVENTION

This object is achieved in accordance with the invention by using a two-mirror system of mirrors constituting ellipsoids of revolution, so assembled that the second mathematical focal point (counting in the direction of passage of the light) of the first ellipsoid of revolution coincides with the first mathematical focal point (likewise counting in the direction of passage of the light) of the second mirror constituting an ellipsoid of revolution, and also assembled so that the entrance pupil of the focusing system lies in the first mathematical focal point of the first ellipsoid of revolution. Furthermore, with a given vertex radius of curvature of the major-axis vertex of the second mirror constituting an ellipsoid of revolution, the ratio of the length of the major axis to the length of the minor axis of the second mirror constituting an ellipsoid of revolution is so selected that the isoplanasie condition for the elimination of the coma of third order is satisfied.

For the correction of the coma of higher order it is advisable to permit slight deviations from the isoplanasie condition and/or slight shifts of the entrance pupil from the first mathematical focal point of the first mirror constituting an ellipsoid of revolution.

The advantages obtained with the invention consist in particular in the good focusing properties of the projection systems and/or visual indicators produced in accordance with the invention.

One embodiment of the invention is shown in the drawing and will be described in further detail below.

BRIEF DESCRIPTION OF THE DRAWING

The single FIGURE shows diagrammatically a focusing system in accordance with the invention.

DESCRIPTION OF THE PREFERRED EMBODIMENT

In the FIGURE, 1 is the first mirror shaped as an ellipsoid of revolution and 2 is the second mirror shaped as an ellipsoid of revolution. At the point 3 there is located the second mathematical focal point (counting the focal points in the direction of passage of the light) of the mirror 1 and this point 3 is also the first mathematical focal point of the mirror 2. The screen onto which the scene is focused by means of the focusing system of the invention is designated at 5. The entrance pupil of the system lies at the place designated by 4. From the FIGURE it can be seen that the mathematical focal points of the mirrors constituting ellipsoids of revolution are not the points where the light of an infinitely remote punctiform object is collected after reflection.

A step-by-step course of development for the carrying out of the invention will be described below.

First of all, the first ellipsoid of revolution is so calculated that the required geometrical and optical structural conditions are satisfied. Thereupon, for a further focusing, the radius of a hollow sphere is so determined that the predetermined structural conditions remain approximately satisfied. This hollow sphere is so inserted into the system that its center point, which is at the same time the mathematical focal point, coincides with the second focal point of the ellipsoid of revolution 1. With this arrangement the deviation from the isoplanasie condition for the entire system is equal to that of the ellipsoid of revolution. The invention is now based on the recognition of the fact that the deviation from the isoplanasie condition can be corrected if, for instance, the vertex radius of curvature of the inserted hollow sphere is retained, but one changes from the sphere to an ellipsoid of revolution whose main axis lies in the common axis of rotation of the surfaces of revolution of the ellipsoids 1 and 2. By step-wise change in the ratio of the major axis to the minor axis the deviation from the isoplanasie condition can be made zero.

For the correction of the coma of higher order it may be advisable to correct the deviation from the isoplanasie condition even beyond zero. In order for the astigmatism to remain corrected, the first mathematical focal point of the ellipsoid of revolution 2 must coincide with the second mathematical focal point of the ellipsoid of revolution 1.

What is claimed is:

1. An optical focusing system comprising two mirrors having reflecting surfaces in the shape of ellipsoids of revolution, characterized by the fact that the mirrors are so positioned relative to each other that the second mathematical focal point of the first ellipsoid of revolution coincides substantially with the first mathematical focal point of the second ellipsoid of revolution, counting the focal points in the direction of passage of the light, and that the entrance pupil of the focusing system lies substantially in the first mathematical focal point of the first ellipsoid of revolution, and that furthermore, with a given vertex radius of curvature of the major-axis vertex of the second ellipsoid of revolution, the ratio of the length of the major axis to the length of the minor axis of this second ellipsoid of revolution is so selected that the isoplanasie condition for the elimination of the coma of third order is satisfied.

2. An optical focusing system according to claim 1, characterized by the fact that for the correction of coma of higher order slight deviations from the exact isoplanasie and/or slight displacement of the entrance pupil from the first mathematical focal point of the first mirror forming an ellipsoid of rotation are provided.

* * * * *